Patented Apr. 27, 1937

2,078,856

UNITED STATES PATENT OFFICE 2,078,856

PROCESS FOR THE PREPARATION OF HIGH MOLECULAR THIO-ETHERS

Alfred Kirstahler, Dusseldorf, Germany, assignor to the firm Henkel & Cie Gesellschaft mit beschrankter Haftung, Dusseldorf, Germany No Drawing. Application October 19, 1933, Serial No. 694,344. In Germany December 29, 1931

13 Claims. (Cl. 260—151)

I have found that a new class of valuable organic substances can be obtained if saturated or unsaturated aliphatic compounds with more than 8 carbon atoms in the molecule which contain one or two mercapto groups are caused to react with 1,2-propylene oxides which are substituted in the methyl residue by reactive groups. Thioethers are thereby formed.

The mercaptans corresponding to the higher fatty alcohols and other alcohols from paraffins may be employed as compounds containing mercapto groups. Of course, the said starting materials may in their turn be substituted by various groups, provided the latter do not take part in the reaction. Polyvalent mercaptans may also be subjected to the reaction, furthermore derivatives of fatty acids which contain mercapto groups, provided their molecule contains more than 8 carbon atoms.

Epichlorhydrin, epibromhydrin, epihydrin alcohol (glycide), thioglycide and many others may be employed for example as 1,2-propylene oxides which are substituted in the methyl residue by reactive groups. If desired the reactions may also be carried out in the presence of reaction accelerating agents, such as for example concentrated sulphuric acid.

The new compounds may inter alia be employed as softening agents for plastic masses. Furthermore they may serve as starting materials for the manufacture of other technically important products, as will become apparent to those skilled in the art.

*Example*

101 parts by weight of dodecyl mercaptan and 46 parts by weight of epichlorhydrin are heated with 0.2 parts of concentrated sulphuric acid at 120° C. for 8 hours. The product purified by washing with water and fractionally distilling in a vacuum is a slightly brown coloured oil of low viscosity which boils at 210–220° C. at a pressure of 2 millimetres.

The present application is a continuation in part of my co-pending application, Serial No. 644,916, filed November 29, 1932.

I claim:

1. A process for the preparation of high molecular thioethers which comprises mixing approximately equimolecular proportions of an aliphatic mercaptan having more than 8 carbon atoms in the molecule and containing at least one mercapto group; and a 1,2-propylene oxide containing in the methyl residue a reactive group which does not react with the mercaptan.

2. A process for the preparation of high molecular thioethers which comprises mixing approximately equimolecular proportions of an unsaturated aliphatic mercaptan having more than 8 carbon atoms in the molecule and containing at least one mercapto group; and a 1,2-propylene oxide containing in the methyl residue a reactive group which does not react with the mercaptan.

3. A process for the preparation of high molecular thioethers which comprises mixing approximately equimolecular proportions of an aliphatic mercaptan having more than 8 carbon atoms in the molecule and containing two mercapto groups; and a 1,2-propylene oxide containing in the methyl residue a reactive group which does not react with the mercaptan.

4. A process for the preparation of high molecular thioethers which comprises mixing approximately equimolecular proportions of an unsaturated aliphatic mercaptan having more than 8 carbon atoms in the molecule and containing two mercapto groups, and a 1,2-propylene oxide containing in the methyl residue a reactive group which does not react with the mercaptan.

5. A process for the preparation of high molecular thioethers which comprises mixing approximately equimolecular proportions of a 1,2-propylene oxide containing in the methyl residue a reactive group which does not take part in the reaction; and an aliphatic mercapto compound having more than 8 carbon atoms in the molecule and containing substituent groups which do not take part in the reaction.

6. A process for the preparation of high molecular thioethers which comprises mixing in the presence of sulphuric acid approximately equimolecular proportions of an aliphatic mercaptan having more than 8 carbon atoms in the molecule and containing at least one mercapto group; and a 1,2-propylene oxide containing in the methyl residue a reactive group which does not react with the mercaptan.

7. A process for the preparation of high molecular thioethers which comprises mixing approximately equimolecular proportions of dodecyl mercaptan and epichlorhydrin.

8. A process for the preparation of high molecular thioethers which comprises mixing approximately equimolecular proportions of dodecyl mercaptan and epichlorhydrin in the presence of sulphuric acid.

9. As new products, the thioethers of the general formula R—S—CH$_2$—CH(OH)—CH$_2$G, wherein R stands for an unsaturated alkyl residue having more than 8 carbon atoms and G for a reactive group selected from a halogen group and a hydroxy group.

10. As new products, the thioethers of the general formula R—S—CH$_2$—CH(OH)—CH$_2$G, wherein R stands for a substituted alkyl residue having more than 8 carbon atoms and G for a reactive group selected from a halogen group and a hydroxy group.

11. As new products, the thioethers of the general formula R—S—CH$_2$—CH(OH)—CH$_2$Cl, wherein R stands for an alkyl residue having more than 8 carbon atoms.

12. A new product of manufacture consisting of the ($\gamma$-chlor-$\beta$-hydroxy-propyl)-dodecyl sulphide.

13. As new products, the thioethers of the general formula R—S—CH$_2$—CH(OH)—CH$_2$G, wherein R stands for an alkyl residue having more than 8 carbon atoms and G for a reactive group selected from a halogen group and a hydroxy group.

ALFRED KIRSTAHLER.